United States Patent
He et al.

(10) Patent No.: US 12,539,849 B2
(45) Date of Patent: Feb. 3, 2026

(54) TRAJECTORY CORRECTION SYSTEM AND METHOD THEREFOR

(71) Applicant: Wistron Corporation, New Taipei (TW)

(72) Inventors: Jyun-Hong He, New Taipei (TW); Xiu-Zhi Chen, New Taipei (TW); Hsin-Han Chiang, New Taipei (TW); Yen-Lin Chen, New Taipei (TW); Kuo-Lun Huang, New Taipei (TW); Shao-Chi Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 283 days.

(21) Appl. No.: 18/185,508

(22) Filed: Mar. 17, 2023

(65) Prior Publication Data

US 2024/0208493 A1 Jun. 27, 2024

(30) Foreign Application Priority Data

Dec. 27, 2022 (TW) .................................. 111150229

(51) Int. Cl.
*B60W 30/095* (2012.01)
*G06N 3/0464* (2023.01)

(52) U.S. Cl.
CPC ....... *B60W 30/0956* (2013.01); *G06N 3/0464* (2023.01); *B60W 2554/40* (2020.02); *B60W 2554/802* (2020.02)

(58) Field of Classification Search
CPC ....... B60W 30/0956; B60W 2554/802; B60W 2554/40; G06N 3/0464
USPC .............................................. 701/26
See application file for complete search history.

(56) References Cited

U.S. PATENT DOCUMENTS

| | | | |
|---|---|---|---|
| 9,216,745 B2* | 12/2015 | Beardsley | G08G 5/727 |
| 11,016,491 B1* | 5/2021 | Millard | G06N 3/045 |
| 11,676,494 B2* | 6/2023 | Chung | B63B 49/00 |
| | | | 342/41 |
| 12,077,190 B2* | 9/2024 | Ng | B60W 60/00272 |

(Continued)

FOREIGN PATENT DOCUMENTS

| | | |
|---|---|---|
| CN | 100570523 C | 12/2009 |
| CN | 102591332 B | 8/2014 |

(Continued)

OTHER PUBLICATIONS

Kao, Patrick. Robust flight navigation with liquid neural networks. Diss. Massachusetts Institute of Technology, 2022. (Year: 2022).*

(Continued)

*Primary Examiner* — Ramya P Burgess
*Assistant Examiner* — Keith A von Volkenburg
(74) *Attorney, Agent, or Firm* — McClure, Qualey & Rodack, LLP (57) ABSTRACT

A trajectory correction method includes: determining whether there is a collision zone according to an initial path and a predicted moving path of a dynamic object; forming a first repulsive object at the corresponding collision zone of an original potential field map in response to determining that there is the collision zone, to obtain a modified potential field map; and obtaining an obstacle avoidance path according to the modified potential field map.

16 Claims, 9 Drawing Sheets

(56) References Cited

U.S. PATENT DOCUMENTS

| | | | | |
|---|---|---|---|---|
| 2008/0058987 A1* | 3/2008 | Ozick | ........... | G05D 1/0255 |
| | | | | 700/250 |
| 2015/0210311 A1* | 7/2015 | Maurer | ........... | B60W 10/20 |
| | | | | 701/41 |
| 2020/0225673 A1* | 7/2020 | Ebrahimi Afrouzi | ........... | |
| | | | | A47L 11/4011 |
| 2022/0066456 A1* | 3/2022 | Ebrahimi Afrouzi | ........... | |
| | | | | G06F 3/04883 |
| 2022/0315047 A1* | 10/2022 | Probst | ........... | B60W 30/16 |
| 2023/0159056 A1* | 5/2023 | Cheng | ........... | B60W 30/0956 |
| | | | | 701/301 |

FOREIGN PATENT DOCUMENTS

| | | | | | |
|---|---|---|---|---|---|
| CN | 102999050 B | | 4/2015 | | |
| CN | 105223956 A | | 1/2016 | | |
| CN | 114620058 A | * | 6/2022 | ........ | B60W 60/0016 |
| DE | 102012208988 A1 | * | 12/2012 | ............ | B60W 30/09 |
| JP | 2008242859 A | * | 10/2008 | | |
| JP | 202030601 A | | 2/2020 | | |
| JP | 202095635 A | | 6/2020 | | |
| JP | 2023535175 A | * | 8/2023 | | |
| KR | 20050097306 A | * | 10/2005 | | |
| KR | 20090032130 A | * | 3/2009 | | |
| KR | 20220055167 A | * | 5/2022 | | |
| TW | 201947338 A | | 12/2019 | | |
| WO | WO-2022016941 A1 | * | 1/2022 | ........ | B60W 30/0956 |

OTHER PUBLICATIONS

Tascillo, A, and R Miller. "An In-Vehicle Virtual Driving Assistant Using Neural Networks." Proceedings of the International Joint Conference on Neural Networks, 2003. vol. 3. IEEE, 2003. 2418-2423 vol. 3. Web. (Year: 2003).*

Liu, Zhixiang et al. "Collision Avoidance and Path Following Control of Unmanned Aerial Vehicle in Hazardous Environment." Journal of intelligent & robotic systems 95.1 (2019): 193-210. Web. (Year: 2019).*

Barrios, Cesar. "Predicting Trajectory Paths for Collision Avoidance Systems." ProQuest Dissertations & Theses, 2015. Print. (Year: 2015).*

Gelbal, Sukru Yaren, Bilin Aksun-Guvenc, and Levent Guvenc. "Collision Avoidance of Low Speed Autonomous Shuttles with Pedestrians." International journal of automotive technology 21.4 (2020): 903-917. Web. (Year: 2020).*

Examination report dated Feb. 27, 2024, listed in related Japan patent application No. 2023-018232.

Examination report dated Jul. 13, 2023, listed in related Taiwan patent application No. 111150229.

The extended European search report dated Aug. 29, 2023, listed in related European patent application No. 23164341.2.

Examination report dated May 8, 2025, listed in related Europe patent application No.23164341.2( publication No. EP4394538).

Sulieman M Hani et al: "Antenna Pattern Aware UAV Trajectory Planning Using Artificial Potential Field", 2021 IEEE/AIAA 40th Digital Avionics Systems Conference (DASC), IEEE, Oct. 3, 2021 (Oct. 3, 2021), pp. 1-7, XP034019626, DOI: 10.1109/DASC52595. 2021.9594394 [retrieved on Oct. 28, 2021].

* cited by examiner

TRAJECTORY CORRECTION SYSTEM AND METHOD THEREFOR

CROSS-REFERENCE TO RELATED APPLICATION

This non-provisional application claims priority under 35 U.S.C. § 119(a) to Patent Application No. 111150229 filed in Taiwan, R.O.C. on Dec. 27, 2022, the entire contents of which are hereby incorporated by reference.

BACKGROUND

Technical Field

The present invention relates to trajectory processing technologies, and in particular, to a trajectory correction system and a method therefor.

Related Art

Trajectory planning is one of the common steps in the field of automation. According to the integrity of environmental information, a trajectory planning method may be divided into two planning methods, such as global planning and local planning. The global planning requires obtaining in advance all environmental information of a field domain where a mobile device (such as a walking robot) is located, so as to plan a trajectory path along which the mobile device can avoid an obstacle to reach a destination in the field domain. The local planning is obtaining environmental information within a certain range of a current location of the mobile device in advance (referred to as local environmental information later), so as to gradually plan a trajectory path along which the mobile device can avoid an obstacle to reach a destination in the field domain. However, in addition to a static obstacle, there is a dynamic obstacle in the field domain, which makes it impossible to plan the trajectory path that can avoid the obstacle, and the mobile device cannot smoothly reach the destination.

SUMMARY

In view of the above, the present invention provides a trajectory correction system and a trajectory correction method. The trajectory correction system includes a memory and a processor. The processor is coupled to the memory. The memory is for storing a program code. The processor is for accessing and executing the program code to determine whether there is a collision zone according to an initial path and a predicted moving path of a dynamic object; form a first repulsive object at the corresponding collision zone of an original potential field map in response to determining that there is the collision zone, to obtain a modified potential field map; and generate an obstacle avoidance path according to the modified potential field map.

The trajectory correction method includes: determining whether there is a collision zone according to an initial path and a predicted moving path of a dynamic object; forming a first repulsive object at the corresponding collision zone of an original potential field map in response to determining that there is the collision zone, to obtain a modified potential field map; and generating an obstacle avoidance path according to the modified potential field map.

Based on the above, according to embodiments of the present invention, the obstacle avoidance path that can really avoid the obstacle is obtained through the initial path of the mobile device, the predicted moving path of the dynamic object (that is, a dynamic obstacle), and a repulsive field of the first repulsive object in the collision zone between the initial path and the predicted moving path, so that the mobile device can smoothly reach the destination. In some embodiments, the obstacle avoidance path may be further obtained through the repulsive object formed by the dynamic object (referred to as a second repulsive object later) in addition to the first repulsive object.

DETAILED DESCRIPTION

A distance between two coordinates may mean a Euclidean distance herein.

Figure 1:
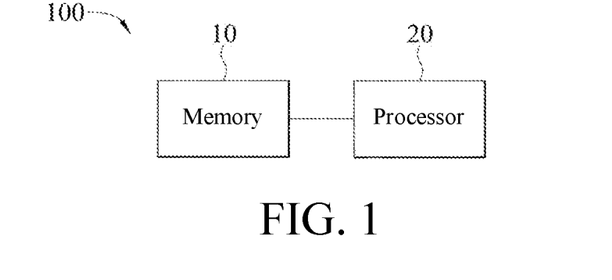
FIG. 1 is a schematic block diagram of a trajectory correction system according to some embodiments of the present invention.

FIG. 1 is a schematic block diagram of a trajectory correction system 100 according to some embodiments of the present invention. The trajectory correction system 100 includes a memory 10 and a processor 20. The processor 20 is coupled to the memory 10. The memory 10 stores a program code for the processor 20 to access and perform a trajectory correction method of the present invention. In some embodiments, the memory 10 and the processor 20 may be arranged inside or outside a mobile device (not shown). The mobile device is, for example, a walking robot. In some embodiments, transfer of data used by the processor 20 when performing the trajectory correction method of the present invention may be realized by using a robot operating system (ROS).

In some embodiments, the memory 10 is, for example, but not limited to, a hard disk drive, a solid-state drive, a flash memory, an optical disk, and the like. In some embodiments, the processor 20 is, for example but not limited to an operational circuit such as a central processing unit, a microprocessor, an application-specific integrated circuit (ASIC), a system on a chip (SOC), or the like. In some embodiments, the processor 20 may be coupled to an input/output interface (not shown). The input/output interface may be connected to a control device (such as a keyboard, a mouse, and so on). The control device is operated by a designer to generate an operation instruction. The operation instruction is transmitted to the processor 20 through the input/output interface, so that the processor 20 executes a corresponding operation in response to the operation instruction. In another embodiment, the processor 20 and the mobile device may also transmit messages with each other through the input/output interface or a communication device (not shown). The processor 20 receives image or sensing information (such as an image capture device and a depth camera) from the mobile device through the input/output interface or the communication device, and correspondingly processes the image or the sensing information (for example, performs image processing or data processing). The processor 20 may also transmit a driving instruction to the mobile device through the input/output interface or the communication device, so as to control the mobile device to move.

Figure 2:
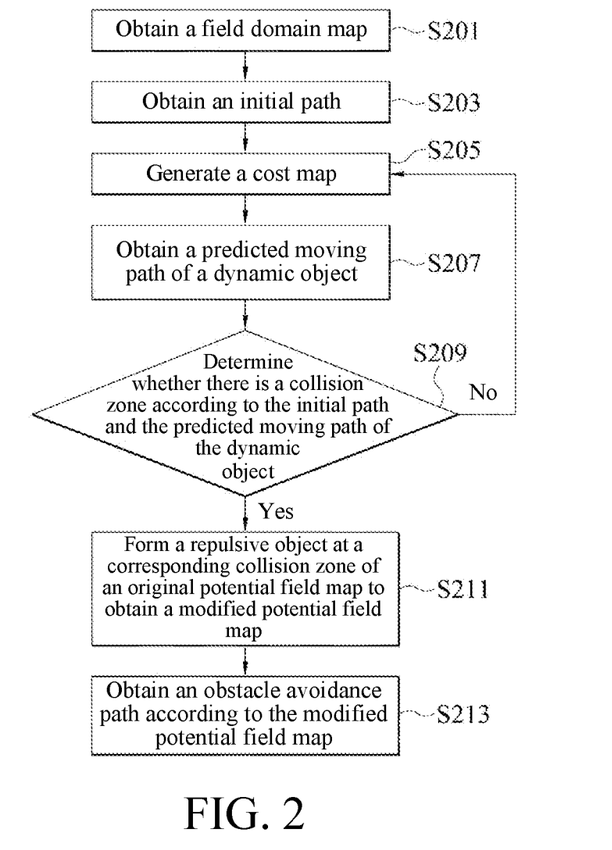
FIG. 2 is a flowchart of a trajectory correction method according to some embodiments of the present invention.

FIG. 2 is a flowchart of a trajectory correction method according to some embodiments of the present invention. First, the processor 20 obtains a field domain map from the memory 10 (step S201). The field domain map may be a top view of the field domain to which the mobile device is to move. Next, the processor 20 obtains start coordinates of the mobile device at an origin of the field domain (the field domain map) and target coordinates at a destination from the memory 10, and plans an initial path L1 according to the start coordinates and the target coordinates, so as to obtain the initial path L1 of the mobile device from the origin to the destination (step S203). Next, the processor 20 may obtain, from the memory 10, the image captured by the mobile device through the image capture device (such as, a camera) thereof during moving of the mobile device. The processor 20 identifies a location and a type of an object (for example, a static object and a dynamic object, where the static object may be, for example, a wall, a table, a chair, or a vase with the position not easily changed, and the dynamic object may be, for example, a pedestrian, a baby carriage, an animal, a child, the elderly, and a vehicle with the position easily changed) in the image through an object detection algorithm (for example, feature matching or neural network inference), and transforms an angle of view of the image to project the object from the top to the field domain map and form a cost map (step S205). Next, the processor 20 tracks the trajectory generated by the object or obtains a historical moving trajectory of the dynamic object from the memory 10. The processor 20 performs a trajectory prediction method according to the tracking trajectory and/or the historical moving trajectory to obtain a predicted moving path L2 of the dynamic object (step S207). The trajectory prediction method may be, for example, an algorithm implemented by a long short-term memory (LSTM) model, a social LSTM model, or a social generative adversarial network (social GAN). In some embodiments, the processor 20 may combine the initial path L1 and the predicted moving path L2 into the cost map for performing the subsequent steps.

After obtaining the initial path L1 of the mobile device and the predicted moving path L2 of the dynamic object, the processor 20 determines whether there is a collision zone BP according to the initial path L1 of the mobile device and the predicted moving path L2 of the dynamic object (step S209). For example, the processor 20 determines whether the initial path L1 and the predicted moving path L2 may intersect at a certain time point. In response to the processor 20 determining that the initial path L1 and the predicted moving path L2 possibly intersect at a certain time point, the processor 20 sets an intersecting area as the collision zone BP and performs step S211. In response to the processor 20 determining that the initial path L1 and the predicted moving path L2 impossibly intersect at a certain time point, the processor 20 performs step S205 and subsequent steps thereof, so as to successively predict the moving path of the dynamic object (that is, obtain the predicted moving path L2 of the dynamic object again) or wait until a new dynamic object is detected and predict the moving path thereof (that is, obtain the predicted moving path L2 of the new dynamic object).

After the collision zone BP is determined, the processor 20 forms a first repulsive object RP at the corresponding collision zone BP of the original potential field map, to obtain the modified potential field map (step S211). For example, the processor 20 calculates a repulsive field of the static object and a gravitational field of the destination in the cost map according to an artificial potential field method, and combines the repulsive field of the static object and the gravitational field of the destination into the cost map to form the original potential field map. Since the initial path L1 and the predicted moving path L2 may be first combined into the cost map first, the processor 20 may learn a position of the collision zone BP corresponding to the original potential field map after determining the collision zone BP. The processor 20 forms the first repulsive object RP of the repulsive field related to the dynamic object at the corresponding collision zone BP of the original potential field map, so as to generate the modified potential field map.

In some embodiments, the processor 20 further forms a second repulsive object RPX moving along the predicted moving path L2 in the original potential field map, and obtains the modified potential field map according to the first repulsive object RP and the second repulsive object RPX. In other words, in addition to the first repulsive object RP, the modified potential field map further has the second repulsive object RPX. The first repulsive object RP and the second repulsive object RPX are associated with the same dynamic object.

After the modified potential field map is obtained, the processor 20 obtains an obstacle avoidance path LA according to the modified potential field map (step S213). For example, since the mobile device is attracted by the gravitational field and repelled by the repulsive field, the processor 20 may calculate, through the resultant action of the gravitational force and the repulsive force in an artificial potential field, the obstacle avoidance path LA that can really avoid all obstacles (for example, the static object and the dynamic object). As shown in FIG. 4A to FIG. 4E, through the first repulsive object RP and the second repulsive object RPX, the obstacle avoidance path LA can bypass an upper portion of the repulsive field of the first repulsive object RP and the second repulsive object RPX without passing through the repulsive fields of the first repulsive object RP and the second repulsive object RPX and without passing through between a lower portion of the repulsive field of the first repulsive object RP and an upper portion of the repulsive field of the second repulsive object RPX. In some embodiments, the processor 20 generates a driving instruction according to the obstacle avoidance path LA, so that a driving device of the mobile device responds to the driving instruction and moves to the destination along the obstacle avoidance path LA. That is to say, the processor 20 controls the mobile device to move along the obstacle avoidance path LA. In some embodiments, the driving device may be implemented by a drivetrain and a driving wheel. The drivetrain may include a motor and a drive shaft connected to the driving wheel.

Figure 3:
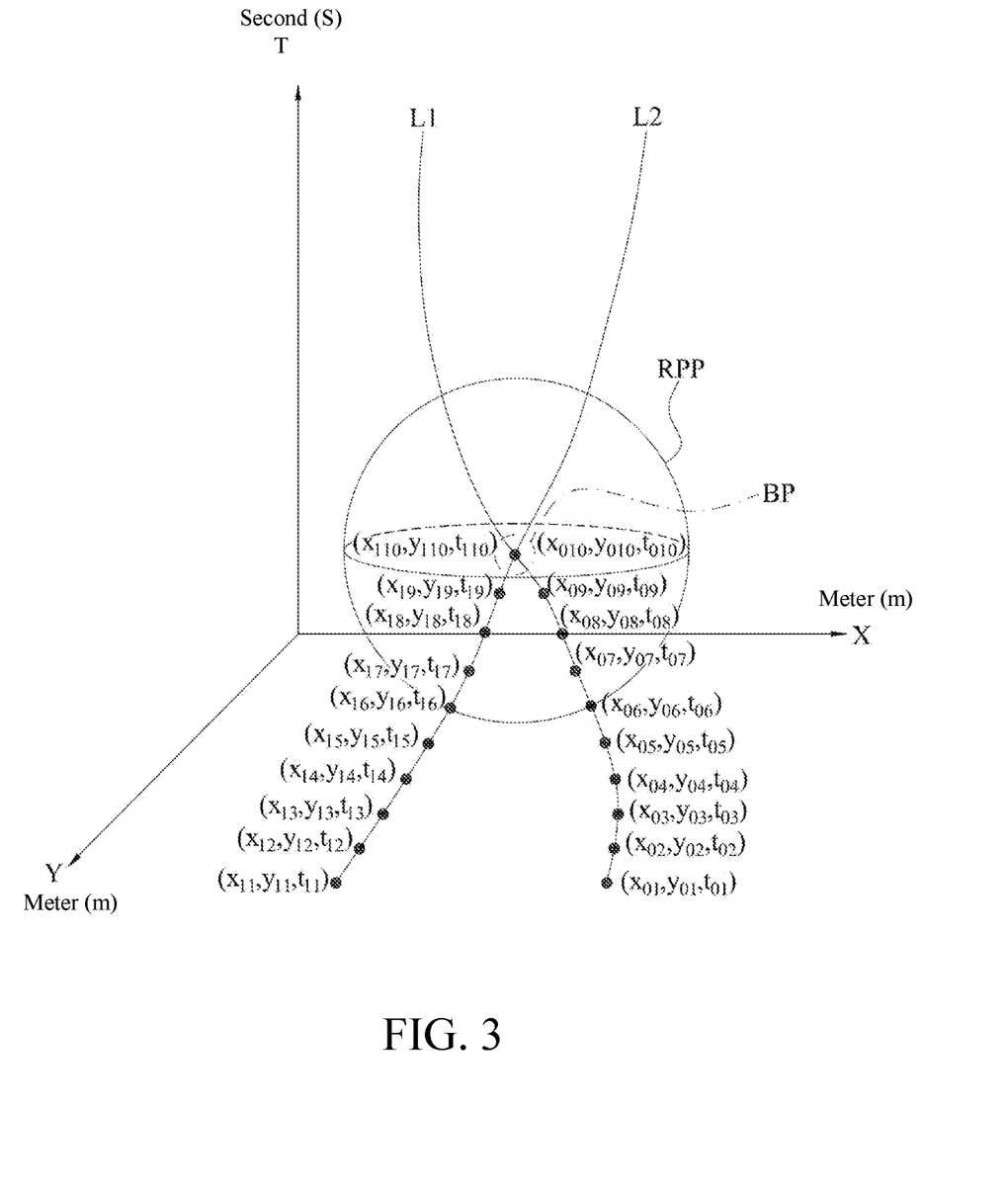
FIG. 3 is a schematic diagram of an initial path and a predicted moving path in a three-dimensional space-time according to some embodiments of the present invention.

Referring to FIG. 3, FIG. 3 is a schematic diagram of an initial path L1 and a predicted moving path L2 in a three-dimensional space-time according to some embodiments of the present invention. A first dimension X and a second dimension Y of the three-dimensional space-time represent a two-dimensional space of the cost map, and a third dimension T of the three-dimensional space-time represents time. In some embodiments, the initial path L1 includes a plurality of first coordinate parameters $(x_{01}, y_{01}, t_{01})$-$(x_{010}, y_{010}, t_{010})$. In an embodiment, the processor 20 may calculate the parameters according to the initial path L1 and a moving speed of the mobile device. The predicted moving path L2 includes a plurality of second coordinate parameters $(x_{11}, y_{11}, t_{11})$-$(x_{110}, y_{110}, t_{110})$. Ten first coordinate parameters and ten second coordinate parameters are drawn herein, but the present invention is not limited thereto. A quantity of the first coordinate parameters and a quantity of the second coordinate parameters may be respectively greater than ten or less than ten. In some embodiments of step S209, the processor 20 determines whether there is a collision zone BP according to the first coordinate parameters $(x_{01}, y_{01}, t_{01})$-$(x_{010}, y_{010}, t_{010})$, the second coordinate parameters $(x_{11}, y_{11}, t_{11})$-$(x_{110}, y_{110}, t_{110})$, and a distance threshold. In some embodiments, the distance threshold may be stored in a memory 10.

In some embodiments, since the initial path L1 and the predicted moving path L2 extend according to a time sequence, each of the first coordinate parameters $(x_{01}, y_{01}, t_{01})$-$(x_{010}, y_{010}, t_{010})$ includes a first coordinate $(x_{01}, y_{01})$-$(x_{010}, y_{010})$ and a first time interval formed by a first time point $t_{01}$-$t_{010}$. Specifically, the first coordinate parameter $(x_{01}, y_{01}, t_{01})$ includes the first coordinate $(x_{01}, y_{01})$ and the first time point $t_{01}$. The first coordinate parameter $(x_{02}, y_{02}, t_{02})$ includes the first coordinate $(x_{02}, y_{02})$ and the first time point $t_{02}$, and so on. The first coordinates $(x_{01}, y_{01})$-$(x_{010}, y_{010})$ are respectively used for indicating a position of the initial path L1 in the cost map in the first time interval of the corresponding first time point $t_{01}$-$t_{010}$. Each of the second coordinate parameters $(x_{11}, y_{11}, t_{11})$-$(x_{110}, y_{110}, t_{110})$ includes a second coordinate $(x_{11}, y_{11})$-$(x_{110}, y_{110})$ and a second time interval formed by a second time points $t_{11}$-$t_{110}$. Specifically, the second coordinate parameter $(x_{11}, y_{11}, t_{11})$ includes the second coordinates $(x_{11}, y_{11})$ and the second time point $t_{11}$, the second coordinate parameter $(x_{12}, y_{12}, t_{12})$ includes the second coordinates $(x_{12}, y_{12})$ and the second time point $t_{12}$, and so on. The second coordinates $(x_{11}, y_{11})$-$(x_{110}, y_{110})$ are respectively used for indicating a position of the predicted moving path L2 in the cost map in the second time interval of the corresponding second time points $t_{11}$-$t_{110}$. The first time points $t_{01}$-$t_{010}$ of the first coordinate parameters $(x_{01}, y_{01}, t_{01})$-$(x_{010}, y_{010}, t_{010})$ are different. The second time points $t_{11}$-$t_{110}$ of the second coordinate parameters $(x_{11}, y_{11}, t_{11})$-$(x_{110}, y_{110}, t_{110})$ are different. For example, the first time points $t_{01}$-$t_{010}$ are spaced apart from each other at equal intervals (for example, the interval between the first time points is 1 second), and the second time points $t_{11}$-$t_{110}$ are spaced apart from each other at equal intervals (for example, the interval between the second time points is 1 second).

In some embodiments of step S209, the processor 20 obtains a distance value according to the first coordinate $(x_{01}, y_{01})$-$(x_{010}, y_{010})$ and the second coordinate $(x_{11}, y_{11})$-$(x_{110}, y_{110})$ corresponding to the substantially identical first time point $t_{01}$-$t_{010}$ and second time point $t_{11}$-$t_{110}$. That is to say, the processor 20 compares the first coordinate $(x_{01}, y_{01})$-$(x_{010}, y_{010})$ and the second coordinate $(x_{11}, y_{11})$-$(x_{110}, y_{110})$ corresponding to the substantially identical first time point $t_{01}$-$t_{010}$ and second time point $t_{11}$-$t_{110}$ to obtain a distance value. In response to the distance value is not greater than the distance threshold, the processor 20 determines that there is a collision zone BP. The first coordinate $(x_{01}, y_{01})$-$(x_{010}, y_{010})$ and the second coordinate $(x_{11}, y_{11})$-$(x_{110}, y_{110})$ corresponding to the distance value not greater than the distance threshold are determined as the collision zone BP. Herein, the substantially identical time points may mean that a time difference between the time points is less than 1 millisecond.

Step S209 is illustrated below by assuming that the first time point $t_{01}$ and the second time point $t_{11}$ are both 0 seconds, the first time point $t_{02}$ and the second time point $t_{12}$ are both 1 second, and so on. The processor 20 calculates Euclidean distances of the first coordinate $(x_{01}, y_{01})$-$(x_{010}, y_{010})$ and the second coordinate $(x_{11}, y_{11})$-$(x_{110}, y_{110})$ corresponding to the substantially identical first time point $t_{01}$-$t_{010}$ and second time point $t_{11}$-$t_{110}$ as distance values. Specifically, the processor 20 calculates the Euclidean distance between the first coordinates $(x_{01}, y_{01})$ and the second coordinates $(x_{11}, y_{11})$ as the distance value based on Equation 1, calculates the Euclidean distance between the first coordinates $(x_{02}, y_{02})$ and the second coordinates $(x_{12}, y_{12})$ as the distance value, and so on. D is a distance value, $x_{0n}$ is a first dimension of the first coordinates, $x_{1n}$ is a first dimension of the second coordinates, $y_{0n}$ is a second dimension of the first coordinates, $y_{1n}$ is a second dimension of the second coordinates, and n is a constant. When the distance value is not greater than the distance threshold, it means that the initial path L1 and the predicted moving path L2 intersect at the corresponding first time point $t_{01}$-$t_{010}$ and second time point $t_{11}$-$t_{110}$ (that is, a collision time point) during calculation of the distance value. For example, as shown in FIG. 3, the initial path L1 and the predicted moving path L2 intersect at the first time point $t_{010}$ and the second time point $t_{110}$. Therefore, the processor 20 may obtain the collision zone BP according to the first coordinate $(x_{010}, y_{010})$ and the second coordinate $(x_{110}, y_{110})$ corresponding to the first time point $t_{010}$ and the second time point $t_{110}$. For example, the coordinate of a central point between the first coordinates $(x_{010}, y_{010})$ and the second coordinates $(x_{110}, y_{110})$ are determined as the collision zone BP, or the distance value between the first coordinate $(x_{010}, y_{010})$ and the second coordinate $(x_{110}, y_{110})$ is used as a radius or a diameter to calculate a circular area as the collision zone BP, but the present invention is not limited thereto. The distance value may be used as a side length of a polygon to calculate a polygonal area as the collision zone BP. In other words, the collision zone BP may be a point or an area.

$$D = \sqrt[2]{(x_{1n} - x_{0n})^2 + (y_{1n} - y_{0n})^2} \qquad \text{(Equation 1)}$$

In some embodiments, the distance threshold corresponds to a size of the dynamic object. Specifically, the distance threshold is less than the size of the dynamic object. In some embodiments, the distance threshold may be a sum of half a size of the mobile device (referred to as a half size below) (for example, a radius) and half the size of the dynamic object (for example, the radius). In this way, it is ensured that it may be determined whether there is the collision zone BP between the initial path L1 and the predicted moving path L2.

Refer to FIG. 3 and FIG. 4A to FIG. 4E. FIG. 4A to FIG. 4E show modified potential field sub-maps of modified potential field maps at different time points according to some embodiments of the present invention. In some embodiments, the processor 20 may select a plurality of time points of previous sequences (referred to as previous timing points later) of the collision time point corresponding to the collision zone BP (for example, the first time point $t_{o10}$ and the second time point $t_{110}$ shown in FIG. 3) in equal proportion. For example, the processor 20 selects four previous timing points of the collision time point at an interval of 1 second. Specifically, the first previous timing point is a time point before 4 seconds of the collision time point, the second previous timing point is a point before 3 seconds of the collision time point, and so on. As shown in FIG. 3, the collision time point correspond to the first time point $t^{o10}$ and the second time point $t_{110}$. The first previous timing point may correspond to the first time point $t_{o6}$ and the second time point $t_{16}$, the second first previous timing point may correspond to the first time point $t_{o7}$ and the second time point $t_{17}$, and so on. The processor 20 may calculate the repulsive field of the dynamic object at different previous timing points and the collision time point according to Equation 2, and form the first repulsive object RP having the repulsive field at the corresponding collision zone BP of the original potential field map, so as to generate a modified potential field sub-map at a plurality of different time points. $U_{rep}(q)$ is a repulsive field value (that is, a strength of a repulsive field), η is a repulsive gain coefficient, D(q) is a distance between the corresponding coordinates of the initial path L1 of the mobile device and the corresponding coordinates of the predicted moving path L2 of the dynamic object at the different previous timing points and the collision time point, and Q* is an obstacle action range threshold of the dynamic object. Then the processor 20 connects the modified potential field sub-maps in series to form the modified potential field map.

$$U_{rep}(q) = \begin{cases} \frac{1}{2}\eta\left(\frac{1}{D(q)} - \frac{1}{Q^*}\right)^2, & D(q) \leq Q^* \\ 0, & D(q) > Q^* \end{cases} \quad \text{(Equation 2)}$$

Figure 4A:
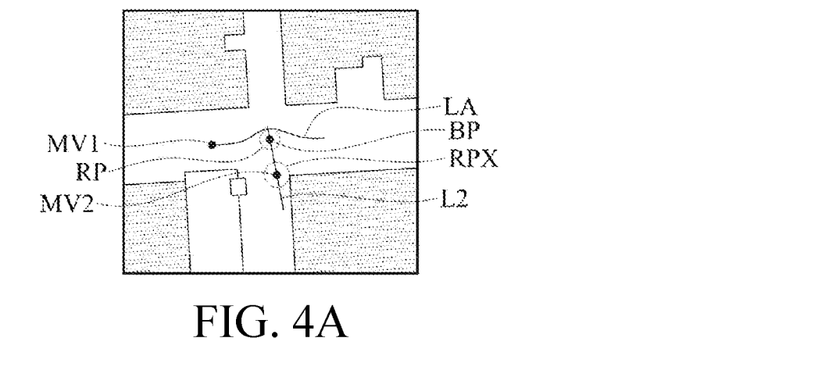
FIG. 4A to FIG. 4E show modified potential field sub-maps of modified potential field maps at different time points according to some embodiments of the present invention.
Figure 4B:
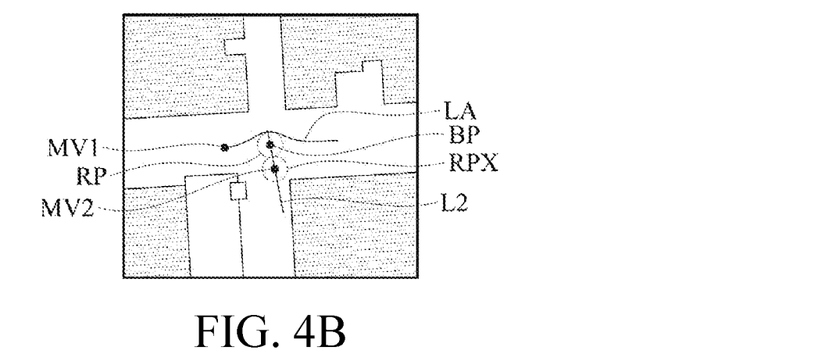
Figure 4C:
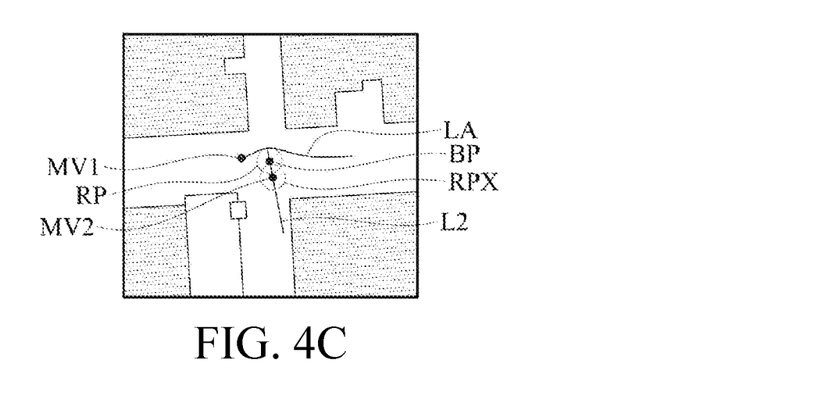
Figure 4D:
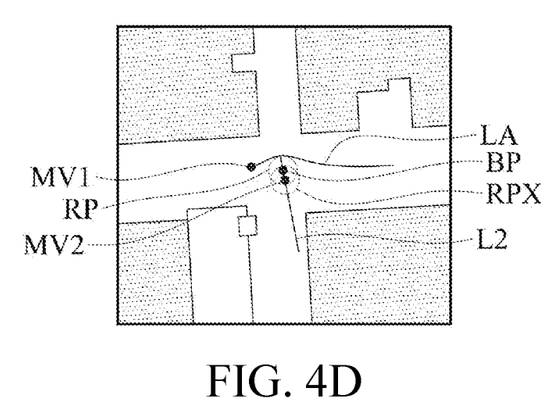
Figure 4E:
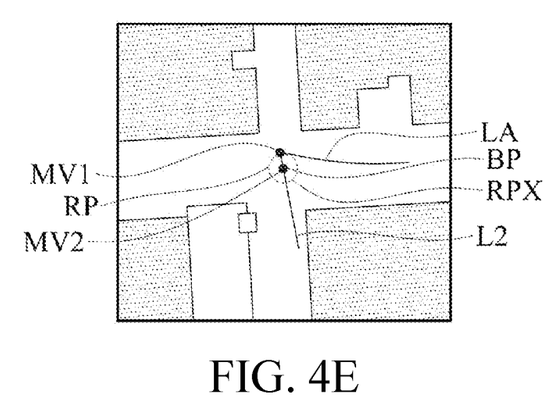

In FIG. 4A to FIG. 4E, a first displacement point MV1 on the obstacle avoidance path LA is a position of the mobile device in the cost map at a current time point. For example, the first displacement point MV1 on the obstacle avoidance path LA in FIG. 4A is the position of the mobile device in the cost map at the first previous timing point, the first displacement point MV1 on the obstacle avoidance path LA in FIG. 4B is the position of the mobile device in the cost map at the second previous timing point, and so on. Moreover, the first displacement point MV1 on the obstacle avoidance path LA in FIG. 4E is the position of the mobile device in the cost map at the collision time point. In FIG. 4A to FIG. 4E, a second displacement point MV2 on the predicted moving path L2 is a position of the dynamic object in the cost map at the current time point. For example, the second displacement point MV1 on the predicted moving path L2 in FIG. 4A is the position of the dynamic object in the cost map at the first previous timing point, the second displacement point MV2 on the predicted moving path L2 in FIG. 4B is the position of the dynamic object in the cost map at the second previous timing point, and so on. Moreover, the second displacement point MV2 on the predicted moving path L2 in FIG. 4E is the position of the dynamic object in the cost map at the collision time point. It can be seen from FIG. 4A to FIG. 4E that with the increase of time, the dynamic object moves along the predicted moving path L2 to move increasingly closer to the collision zone BP where the predicted moving path L2 intersects the initial path L1, and the dynamic object collides with the mobile device moving on the initial path L1 in the collision zone BP at the collision time point. Therefore, the initial path L1 may be modified to the obstacle avoidance path LA by forming the first repulsive object RP in the collision zone BP before the collision time point, so that the mobile device moves along the obstacle avoidance path LA, thereby avoiding the collision between the mobile device and the dynamic object in advance.

As shown in FIG. 3, a repulsive force pattern (RPP) composed of repulsive fields at different previous timing points and the collision time points calculated by Equation 2 is shown. In some embodiments, at the first previous timing point, the strength of the repulsive field of the first repulsive object RP is a tangent plane formed by the RPP in the first dimension X and the second dimension Y at the first time point 106 and the second time point $t_{16}$ (as shown by a boundary size of the first repulsive object RP in FIG. 4A). At the second previous timing point, the strength of the repulsive field of the first repulsive object RP is a tangent plane formed by the RPP in the first dimension X and the second dimension Y at the first time point $t_{o7}$ and the second time point $t_{17}$ (as shown by a boundary size of the first repulsive object RP in FIG. 4B), and so on. At the collision time point, the strength of the repulsive field of the first repulsive object RP is a tangent plane formed by the RPP in the first dimension X and the second dimension Y at the first time point $t_{o10}$ and the second time point $t_{110}$ (as shown by a boundary size of the first repulsive object RP in FIG. 4E).

In some embodiments, as shown in FIG. 3 and FIG. 4A to FIG. 4E, it can be seen that the strength of the repulsive field of the first repulsive object RP changes with time. For example, prior to the collision time point, the strength of the repulsive field of the first repulsive object RP gradually increases with the increase of time (as shown in FIG. 4A to FIG. 4E, the boundary size of the first repulsive object RP gradually increases). In some embodiments, the strength of the repulsive field of the first repulsive object RP is at a maximum value at the collision time point corresponding to the collision zone BP. That is to say, before the collision time point, the strength of the repulsive field of the first repulsive object RP gradually increases with the increase of time, and the strength of the repulsive field of the first repulsive object RP gradually decreases with the increase of time after the collision time point. In some embodiments, the strength of the repulsive field of the second repulsive object RPX is fixed compared with the first repulsive object RP. In some embodiments, the strength of the repulsive field of the second repulsive object RPX is the same as the strength of the repulsive field of the first repulsive object RP at the collision time point corresponding to the collision zone BP.

In some embodiments, the strength of the repulsive field of the first repulsive object RP and the second repulsive object RPX correspond to a type of the dynamic object. Specifically, some types of dynamic objects may cause bigger obstacles during moving of the mobile device, and some other types of dynamic objects may cause smaller obstacles during moving of the mobile device. For example, a baby carriage causes a bigger obstacle than a pedestrian. Specifically, in a case that the type of the dynamic object is the pedestrian, η in Equation 2 may be 0.5, and Q* may be 0.5 m (meter). In a case that the type of the dynamic object is the baby carriage, η in Equation 2 may be 1, and Q* may be 1 m (meter). In this case, when D(q) is 0.5 m (meter), $U_{rep}(q)$ is 0.25 in the case that the type of the dynamic object is the pedestrian, and $U_{rep}(q)$ is 0.5 in the case that the dynamic object is the baby carriage. That is to say, the baby carriage has a larger strength of the repulsive field than the pedestrian.

Figure 5A:
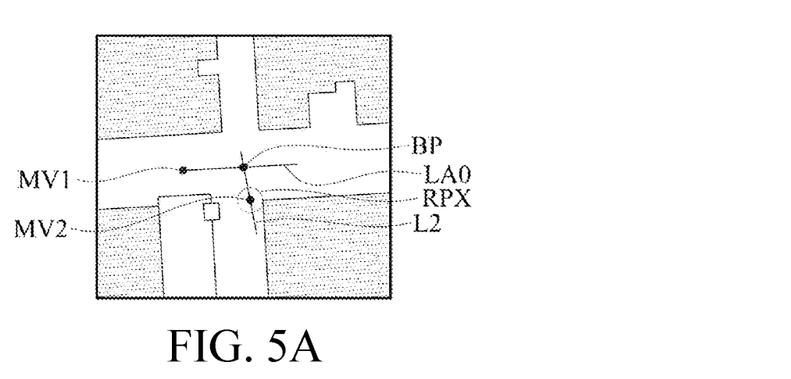
FIG. 5A to FIG. 5E show modified potential field sub-maps of modified potential field maps at different time points according to a comparative example the present invention.
Figure 5B:
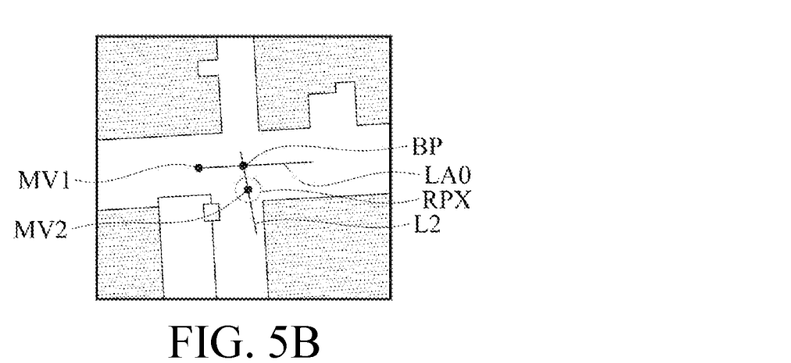
Figure 5C:
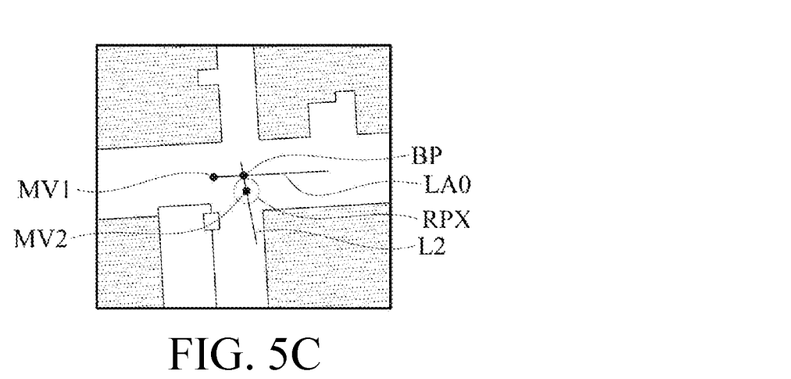
Figure 5D:
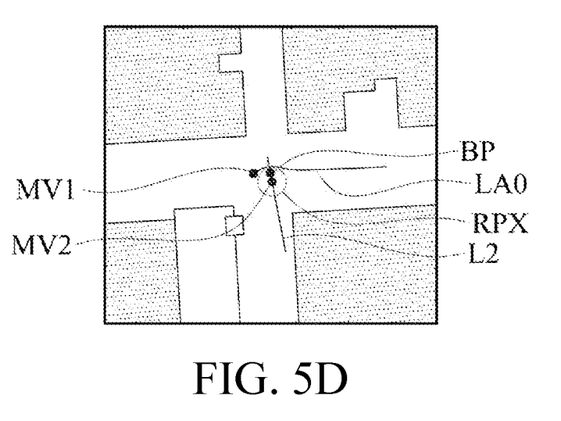
Figure 5E:
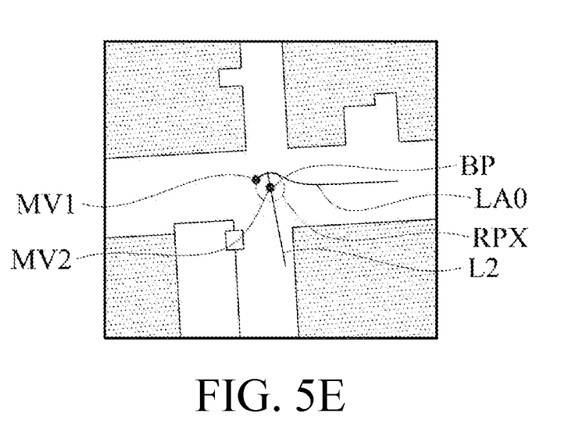

Refer to FIG. 4A to FIG. 4E and FIG. 5A to FIG. 5E. FIG. 5A to FIG. 5E show modified potential field submaps of modified potential field maps at different time points according to a comparative example the present invention. In FIG. 5A to FIG. 5E, a first displacement point MV1 on an obstacle avoidance path LA0 is a position of the mobile device in the cost map at a current time point. For example, the first displacement point MV1 on the obstacle avoidance path LA0 in FIG. 5A is the position of the mobile device in the cost map at the first previous timing point, the first displacement point MV1 on the obstacle avoidance path LA0 in FIG. 5B is the position of the mobile device in the cost map at the second previous timing point, and so on. Moreover, the first displacement point MV1 on the obstacle avoidance path LA0 in FIG. 5E is the position of the mobile device in the cost map at the collision time point. In FIG. 5A to FIG. 5E, a second displacement point MV2 on the predicted moving path L2 is a position of the dynamic object in the cost map at the current time point. For example, the second displacement point MV2 on the predicted moving path L2 in FIG. 5A is the position of the dynamic object in the cost map at the first previous timing point, the second displacement point MV2 on the predicted moving path L2 in FIG. 5B is the position of the dynamic object in the cost map at the second previous timing point, and so on. Moreover, the second displacement point MV2 on the predicted moving path L2 in FIG. 5E is the position of the dynamic object in the cost map at the collision time point.

In the comparison example, the processor 20 does not form the first repulsive object RP having the repulsive field at the corresponding collision zone BP of the original potential field map at the plurality of time points prior to the collision time point. The processor 20 modifies the initial path L1 to the obstacle avoidance path LA0 only by forming, in the original potential field map, the second repulsive object RPX of the dynamic object that moves along the predicted moving path L2 over time. Compared with the comparison example, in the embodiment of the present invention, the processor 20 modifies the initial path L1 to the obstacle avoidance path LA through both the second repulsive object RPX and the first repulsive object RP. Specifically, the processor 20 forms the first repulsive object RP having the repulsive field at the corresponding collision zone BP of the original potential field map at the collision time point and the different previous timing points prior to the collision time point. The strengths of the repulsive fields gradually increase with the increase of time prior to the collision time point. Therefore, compared with the comparison example, according to the embodiment of the present invention, the processor may be aware of the presence of the obstacle in advance, and update the obstacle avoidance path LA in real time, so that the mobile device can indeed avoid the obstacle when moving along the obstacle avoidance path LA. For example, in the comparison example, the processor 20 is not aware of the presence of the obstacle until the fourth previous timing point. In the embodiment of the present invention, the processor 20 is aware of the presence of the obstacle at the first previous timing point, and the mobile device moves along the obstacle avoidance path LA in which the first repulsive object RP is considered. In addition, the present invention further reduces a risk of turnover caused by quick turning of the mobile device during the moving in order to avoid the obstacle. For example, since the processor 20 is aware of the presence of the obstacle at the first previous timing point, the processor 20 may slow down the mobile device in advance and move along the obstacle avoidance path LA in which the first repulsive object RP is considered, so as to avoid the risk of turnover of the mobile device during the control of the movement of the mobile device along the obstacle avoidance path LA at the fourth previous timing point.

In some embodiments of step S213, the processor 20 inputs the modified potential field map into a neural network, and obtains the obstacle avoidance path LA through the operation of the neural network. The neural network may be implemented by the processor 20 or an additional calculating device through operation by using some algorithms. For example, the designer may input a plurality of modified potential field sample graphs having an obstacle avoidance sample path LS to the processor 20 (or a calculating device, and only the processor 20 is used as an example for ease of description) through an input/output interface. The neural network of the processor 20 performs continuous time recursive training according to the modified potential field sample graph, to determine a determination logic. The performs continuous time recursive training may be a known or self-developed model. The neural network may generate the obstacle avoidance path LA of the mobile device in the field domain according to the modified potential field map and the determination logic. In some embodiments, the neural network includes a convolutional neural network and a liquid time-constant network (LTC) coupled to the convolutional neural network. In some embodiments, the processor 20 generates the obstacle avoidance path LA through the modified potential field map and an artificial potential field method, or generates the obstacle avoidance path LA through the modified potential field map and the neural network (for example, the continuous time recursive neural network). A difference between the artificial potential field method and the neural network is that the operation may be performed through the artificial potential field method without prior training. Compared with the artificial potential field method, a sequence feature may be learned through the neural network (for example, the liquid time-constant network), so that the obstacle avoidance path LA has better performance, and the obstacle avoidance path LA can have higher planning stability and is not easy to produce an endless loop. In addition, since a quantity of parameters in the neural network architecture is fixed, the execution speed is stable, a calculation speed is fast, and a response time is short in the case of a plurality of dynamic objects. In addition, through the neural network (for example, the liquid time-constant network), the processor 20 may calculate the obstacle avoidance path LA when determining that there is the collision zone BP, and therefore the processor 20 has a small operation burden.

Figure 6:
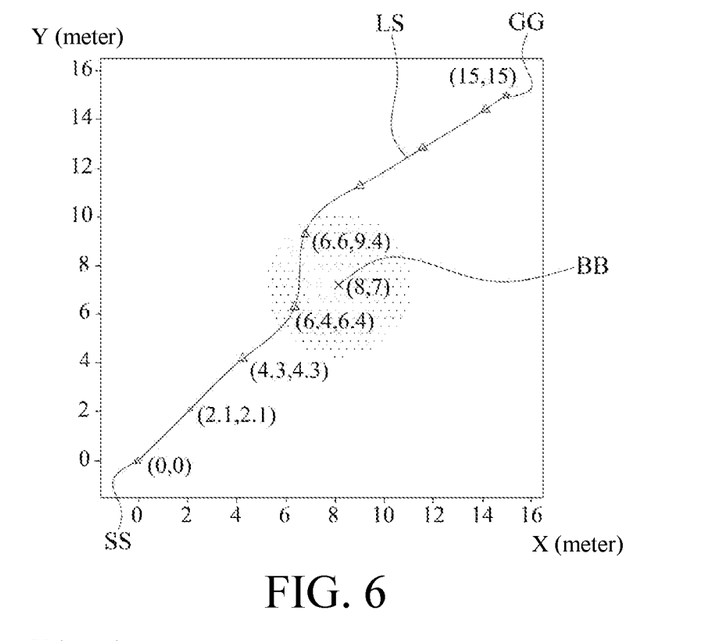
FIG. 6 is a schematic diagram of an obstacle avoidance sample path according to some embodiments of the present invention.
Figure 7A:
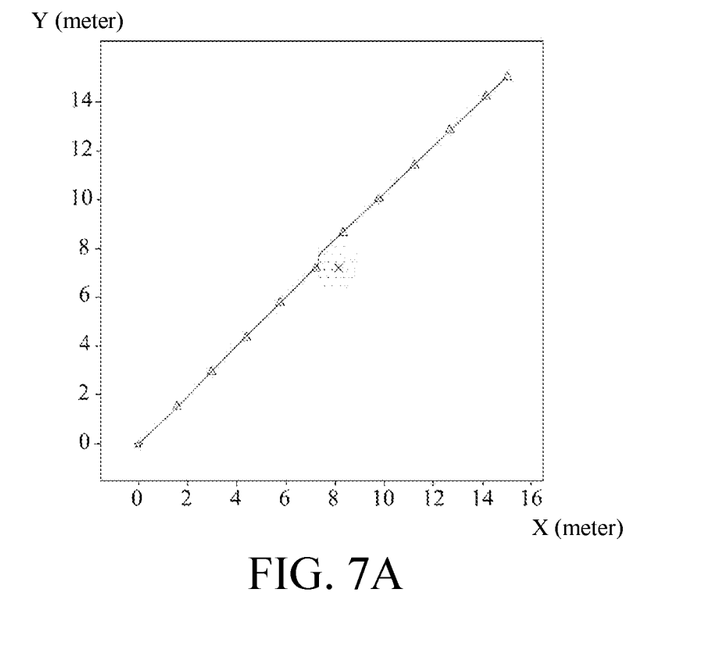
FIG. 7A to FIG. 7D show modified potential field sample sub-maps of modified potential field sample maps at different time points according to some embodiments of the present invention.
Figure 7B:
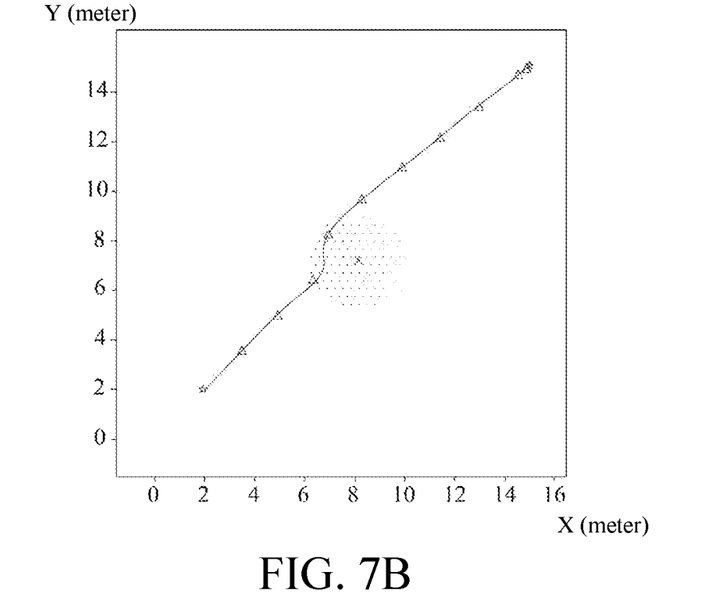
Figure 7C:
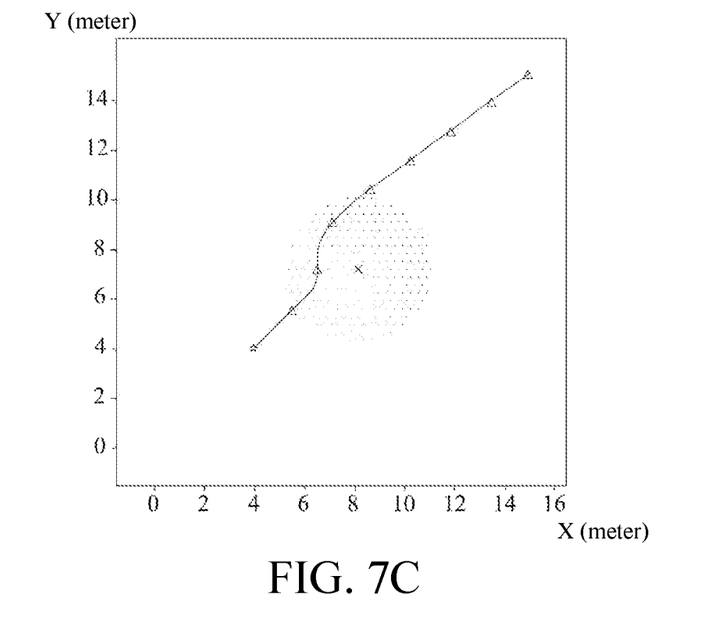
Figure 7D:
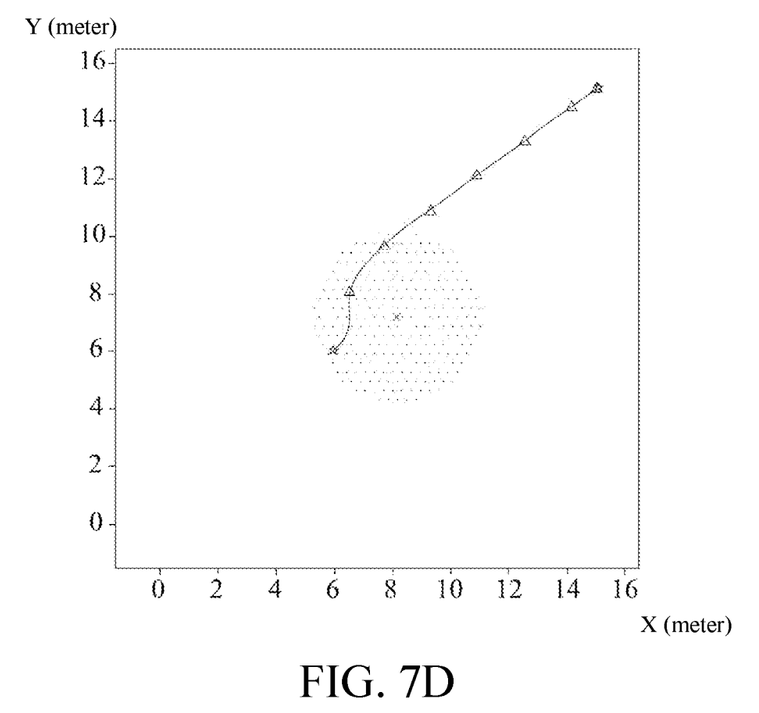

Refer to FIG. 6 and FIG. 7A to FIG. 7D. FIG. 6 is a schematic diagram of an obstacle avoidance sample path LS according to some embodiments of the present invention. FIG. 7A to FIG. 7D show modified potential field sample sub-maps of modified potential field sample maps at different time points according to some embodiments of the present invention. How to generate the modified potential field sample map and the obstacle avoidance sample path LS thereof is described below. It is assumed that preset start sample coordinates of an origin SS in a cost sample map in a cost sample map are (0, 0), target sample coordinates of a destination GG in the cost sample map are (15, 15), and sample coordinates of the collision zone BB are (8, 7). The processor 20 may calculate coordinates of each path point according to Equation 3, Equation 4, the start sample coordinates, the coordinates of the assumed current position of the mobile device (that is, a current path point), coordinates of the assumed current position of the dynamic object, the target sample coordinates, and a length of a step length of the mobile device per unit time, so as obtain the obstacle avoidance sample path LS. $U_{att}(q)$ is a gravitational field value (that is, the strength of a gravitational field), k is a gravitational gain coefficient, G(q) is a distance between the coordinates of the assumed current position (that is, a current path point) of the mobile device at a different time point and the target sample coordinates, $U_{reps}(q)$ is a repulsive field value (that is, a strength of a repulsive field), n is a repulsive gain coefficient, DD(q) is a distance between the coordinates of the assumed current position (that is, the current path point) of the mobile device and the coordinates of the assumed current position of the dynamic object at the different time point, and QQ* is an obstacle action rang threshold of the dynamic object.

$$U_{att}(q) = kG(q) \quad \text{(Equation 3)}$$

$$U_{reps}(q) = \begin{cases} \eta\left(\frac{1}{DD(q)} - \frac{1}{QQ^*}\right)^2 \Big/ DD(q)^2 G(q)^2, & DD(q) \leq QQ^* \\ 0, & DD(q) > Q^{Q^*} \end{cases} \quad \text{(Equation 4)}$$

In the following, specifically, it is assumed that a step length of the mobile device per second is 3 m, QQ* is 3 m, k is 1, and η is 1.5. The processor 20 uses the start sample coordinates as coordinates of a first path point of the obstacle avoidance sample path LS. Next, the processor 20 calculates the strength of the gravitational field applied to the start sample coordinates according to Equation 3. For example, the strength of the gravitational field is (15, 15). The processor 20 calculates coordinates of a second path point by gradient descent in a direction of the start sample coordinates pointing to the target sample coordinates (that is, a direction of gravity). The gravitational field direction is, for example, (0.707, 0.707), and the coordinates of the second path point is, for example, calculated by multiplying the gravitational field direction by the step length, that is to say, the coordinates of the second path point are, for example, (0.707,0.707)×3≈(2.1,2.1). Then, since the second path point does not fall within the obstacle action range of the dynamic object (for example, a range of a circle formed by a radius of 3 m of the sample coordinates that does not fall within the collision zone), coordinates of a third path point and a fourth path point may be calculated in the manner in which the second path point is calculated. For example, the coordinates of the third path point are (0.707, 0.707)×6≈(4.3,4.3), and the coordinates of the fourth path point are (0.707,0.707)×9≈(6.4,6.4).

In the following, since the fourth path point falls within the obstacle action range of the dynamic object, the processor 20 calculates the strength of the gravitational field applied to the fourth path point according to Equation 3. For example, the strength of the gravitational field is (8.64, 8.64). In this case, the direction of the gravitational field applied to the fourth path point is still (0.707, 0.707). The processor 20 calculates the strength of the repulsive field applied to the fourth path point according to Equation 4. For example, the strength of the repulsive field is (−8.19, −3.58). In this case, a direction of the repulsive field applied to the fourth path point is the direction in which the coordinates of the current position of the dynamic object point to the coordinates of the fourth path point. For example, the repulsive field direction is (−0.925, −0.381). In this way, a direction of a resultant force applied to the fourth path point (referred to as a resultant direction below) is (0.088, 0.966). Next, the processor 20 calculates coordinates of a fifth path point by gradient descent according to the coordinates of the fourth path point and the resultant direction. The coordinates of the fifth path point are, for example, a value calculated by multiplying the resultant direction by the step length plus the coordinates of the fourth path point. That is, the coordinates of the fifth path point are, for example, (6.4,6.4)+(0.088, 0.996)×3≈(6.6,9.4). The processor 20 performs the path point algorithm again until the finally calculated distance between the coordinates of the path point and the target sample coordinates is less than the step length. In this way, a plurality of path points forming the obstacle avoidance sample path LS can be obtained. The processor 20 combines the strengths of the repulsive fields of the dynamic object at different time points with the obstacle avoidance sample path LS and the cost sample map to form a plurality of modified potential field sample sub-maps at different time points. Then, the processor 20 connects the modified potential field sample sub-maps in series to form the modified potential field sample map for training of the neural network.

Based on the above, according to embodiments of the present invention, the obstacle avoidance path that can really avoid the obstacle is obtained through the initial path of the mobile device, the predicted moving path of the dynamic object (that is, a dynamic obstacle), and a repulsive field of the first repulsive object in the collision zone between the initial path and the predicted moving path, so that the mobile device can smoothly reach the destination. In some embodiments, the obstacle avoidance path may be further obtained through the second repulsive object formed by the dynamic object in addition to the first repulsive object.

What is claimed is:

1. A trajectory correction system, comprising:
 a memory, for storing a program code; and
 a processor, coupled to the memory, for accessing and executing the program code to:
  determine whether there is a collision zone according to an initial path of a mobile device and a predicted moving path of a dynamic object, wherein the collision zone is an intersecting area between the initial path and the predicted moving path;
  form a first repulsive object at a collision zone position corresponding to the collision zone in an original potential field map in response to determining that there is the collision zone and form a second repulsive object corresponding to the dynamic object that moves along the predicted moving path over time in the original potential field map, to obtain a modified potential field map, wherein a strength of a repulsive field of the second repulsive object is the same as a strength of a repulsive field of the first repulsive object at a collision time point corresponding to the collision zone;
  generate an obstacle avoidance path according to the modified potential field map; and
  control a driving device of the mobile device to move along the obstacle avoidance path.

2. The trajectory correction system according to claim 1, wherein the strength of the repulsive field of the first repulsive object or the second repulsive object corresponds to a type of the dynamic object.

3. The trajectory correction system according to claim 1, wherein the processor inputs the modified potential field map into a neural network to obtain the obstacle avoidance path.

4. The trajectory correction system according to claim 3, wherein the neural network comprises a convolutional neural network and a liquid time-constant network (LTC).

5. The trajectory correction system according to claim 1, wherein the initial path comprises a plurality of first coordinate parameters, the predicted moving path comprises a plurality of second coordinate parameters, and the processor determines whether there is the collision zone according to the first coordinate parameters, the second coordinate parameters, and a distance threshold.

6. The trajectory correction system according to claim 5, wherein each of the first coordinate parameters comprises a first coordinate and a first time point, each of the second coordinate parameters comprises a second coordinate and a second time point, and the processor obtains a distance value according to the first coordinate corresponding to the first time point and the second coordinate corresponding to the second time point, determines that there is the collision zone in response to the distance value is not greater than the distance threshold, and determines the first coordinates and the second coordinates corresponding to the distance value as the collision zone.

7. The trajectory correction system according to claim 5, wherein the distance threshold is a size corresponding to the dynamic object.

8. The trajectory correction system according to claim 1, wherein the strength of the repulsive field of the first repulsive object corresponding to the collision zone changes with time, and the strength of the repulsive field of the first repulsive object is at a maximum value at a collision time point corresponding to the collision zone.

9. A trajectory correction method, comprising:
determining whether there is a collision zone according to an initial path of a mobile device and a predicted moving path of a dynamic object, wherein the collision zone is an intersecting area between the initial path and the predicted moving path;
forming a first repulsive object at a collision zone position corresponding to the collision zone in an original potential field map in response to determining that there is the collision zone and forming a second repulsive object corresponding to the dynamic object that moves along the predicted moving path over time in the original potential field map, to obtain a modified potential field map, wherein a strength of a repulsive field of the second repulsive object is the same as a strength of a repulsive field of the first repulsive object at a collision time point corresponding to the collision zone;
generating an obstacle avoidance path according to the modified potential field map; and
controlling a driving device of the mobile device to move along the obstacle avoidance path.

10. The trajectory correction method according to claim 9, wherein the strength of the repulsive field of the first repulsive object or the second repulsive object corresponds to a type of the dynamic object.

11. The trajectory correction method according to claim 9, wherein the modified potential field map is inputted into a neural network to obtain the obstacle avoidance path.

12. The trajectory correction method according to claim 11, wherein the neural network comprises a convolutional neural network and a liquid time-constant network (LTC).

13. The trajectory correction method according to claim 9, wherein the initial path comprises a plurality of first coordinate parameters, the predicted moving path comprises a plurality of second coordinate parameters, and the collision zone is determined according to the first coordinate parameters, the second coordinate parameters, and a distance threshold.

14. The trajectory correction method according to claim 13, wherein each of the first coordinate parameters comprises a first coordinate and a first time point, each of the second coordinate parameters comprises a second coordinate and a second time point, obtaining a distance value according to the first coordinate corresponding to the first time point and the second coordinate corresponding to the second time point, the collision zone is determined in response to the distance value is not greater than the distance threshold, and the first coordinates and the second coordinates corresponding to the distance value are determined as the collision zone.

15. The trajectory correction method according to claim 13, wherein the distance threshold is a size corresponding to the dynamic object.

16. The trajectory correction method according to claim 9, wherein the strength of the repulsive field of the first repulsive object corresponding to the collision zone changes with time, and the strength of the repulsive field of the first repulsive object is at a maximum value at a collision time point corresponding to the collision zone.

* * * * *